P. G. GARDINER.
Car Coupling.
No. 108,698.
2 Sheets—Sheet 1.
Patented Oct. 25, 1870.
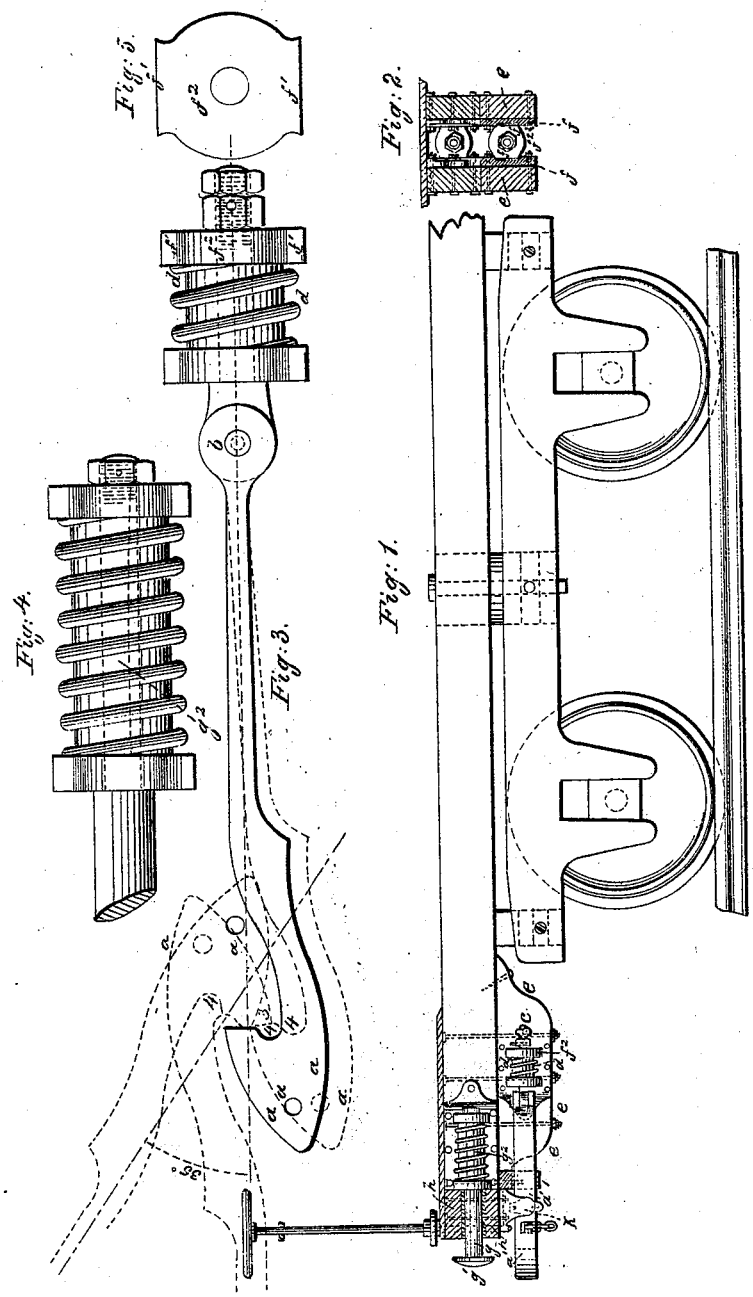

P. G. GARDINER.
Car Coupling.
No. 108,698.
2 Sheets—Sheet 2.
Patented Oct. 25, 1870.
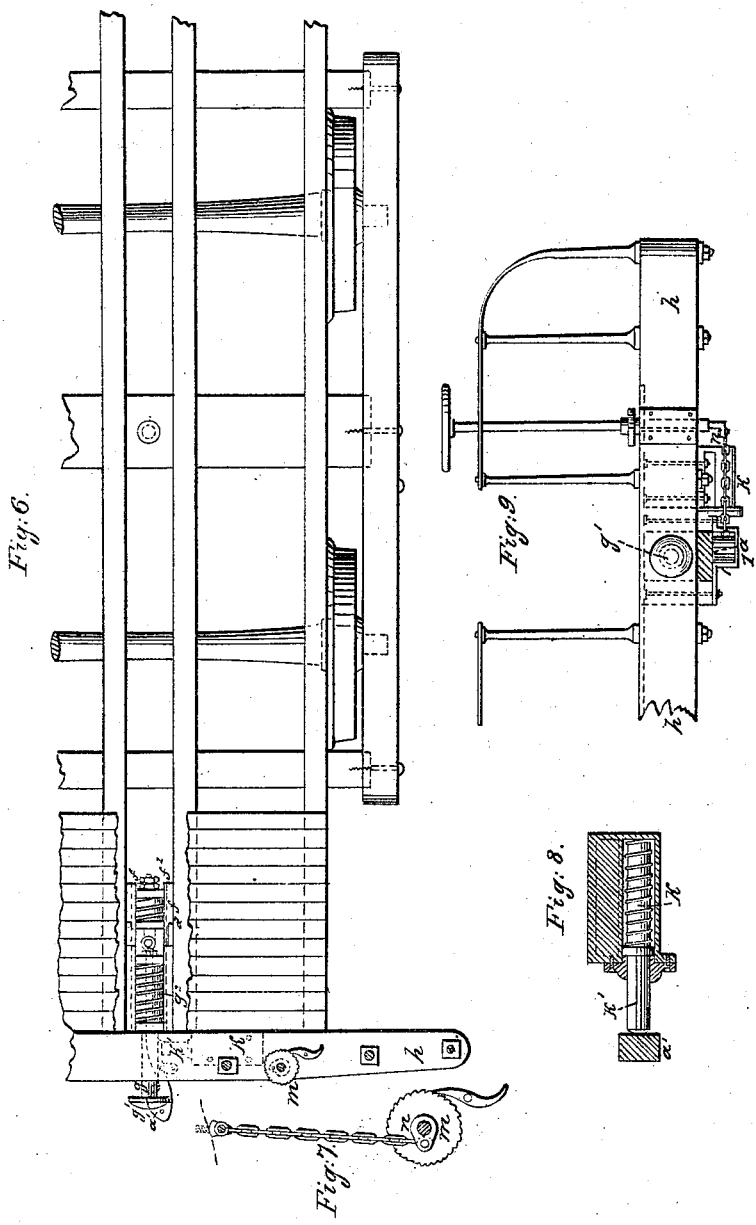

UNITED STATES PATENT OFFICE.

PERRY G. GARDINER, OF NEW YORK, N. Y.

IMPROVEMENT IN RAILWAY-CAR COUPLERS AND BUFFERS.

Specification forming part of Letters Patent No. 108,698, dated October 25, 1870.

*To all whom it may concern:*

Be it known that I, PERRY G. GARDINER, of the city, county, and State of New York, have invented a new and useful Improvement in Devices for Connecting, Drawing, and Disconnecting Railroad-Cars; and I do hereby declare the following to be a full, clear, and exact description thereof, which will enable others skilled in the art to which it appertains to make and use my invention, reference being had to the annexed drawings, which is a part of this specification, and in which—

Figure 1, Sheet 1, is a side view of my improvement attached to the platform of an ordinary railroad-car, showing the spring-buffer, coupling-hook, draw-bar, and spring, and bearing-timbers. Fig. 2, Sheet 1, is a transverse view of the bearings of the buffer and draw-spring. Fig. 3, Sheet 1, is a plan of the coupling-hook, shank, draw-bar, and spring, showing different positions of the coupling-hooks in dotted lines. Fig. 4, Sheet 1, is a plan of part of the buffer-rod and spring which I prefer to use in connection therewith. Fig. 5, Sheet 1, represents one of the bearing-plates of the buffer-rod and draw-bar. Fig. 6, Sheet 2, is a plan of my improvement attached to an ordinary railroad-car, the platform being broken away in the middle and part of my improvement being shown in dotted lines. Fig. 7, Sheet 2, is a plan of the ratchet and pawl, crank, and chain by which the disconnecting is effected. Fig. 8, Sheet 2, is a transverse section of the shank of the coupling-hook, showing in side view the spring and pusher by which the coupling-hooks are locked; and Fig. 9, Sheet 2, is an end view of my improvement attached to the platform of a railroad-car.

The same parts are denoted by the same letters in all the figures.

Two stout blocks of wood, $e\ e$, are bolted or screwed or secured in any suitable way to the inner longitudinal sills of the car-body, as shown in Figs. 1 and 2. To these sills is also bolted the stirrup 1, Figs. 1 and 9, which forms the bearing of the shank $a'$ of the coupling-hook $a$, and whose sides limit the lateral vibrations of the shank, which is pivoted at 6 to to the draft-rod or draw-bar $c$, Figs. 1 and 3. Metal plates $f\ f$, Fig. 2, are screwed to the inner faces of the blocks $e\ e$, and the inner faces of these plates are grooved or slotted to receive the projecting guides $f'$ of the compressing-plate $f^2$, which slides back and forth between the plates $f\ f$. The draw-bar $c$ passes through this plate $f^2$, and also through a fixed plate of similar form, (seen in Figs. 1 and 3,) which acts as the front bearing of the draw-spring $d$. The draw-bar being thus jointed to the shank of the coupling-hook, and passing through the fixed plate, draw-spring, and compressing-plate, where it is firmly secured by a nut or other suitable device, it is evident that the draw-spring will be compressed by a pull on the coupling-hook. The rod $g$, attached to the buffer-head $g'$, passes through a bushing or collar in the buffer-beam $h$, and extends between the inner longitudinal sills of the car-body and through the spring $g^2$. This buffer-spring is arranged to act between a fixed plate and a compressing-plate constructed with projecting guides, and sliding in grooved or slotted plates of metal, which are fastened to the inner faces of the inner longitudinal sills of the car-body. These devices are the same as those which have been described in connection with the draw-spring, and are arranged in the same manner, except that the plate in the rear of the buffer-spring is fixed, while the front one or compressing-plate is firmly attached to the buffer-rod $g$, so as to compress the spring when the buffer is under pressure.

The spring which I prefer to use is a coil inclosing a rubber cylinder. By reference to Figs. 3 and 4 it will be seen that the diameter of the coil is nearly equal to the width of the plates $f^2$, so that the coils project into the grooves of the plates $f\ f$. The object of this arrangement is to prevent the strain on the fixed plates from being borne by the guides $f'\ f'$, as it would be if the diameter of the coil were not greater than the distance between the guides, while by this arrangement the strain is transmitted from the coil to the timbers or other bearing against which the guides rest, so as to obviate the danger of breaking the guides.

In order to maintain an elastic connection between the cars under all circumstances, I arrange the buffer and coupling-hook so that the outer face of the buffer-head shall project beyond the inner face of the coupling-hook to which the draft is applied a distance greater than the range of motion of the draw-spring; and I also construct the buffer-spring so that its range of motion shall be greater than the distance which the outer face of the buffer projects beyond the inner face of the coupling-hook. By this arrangement the buffer-spring is compressed in coupling the cars to a distance greater than the range of motion of the draw-spring, so that if when the train is starting or in motion the elastic power of the draw-spring should be exhausted by a sudden jerk, or from any other cause, the buffer-spring will still be under pressure and will maintain an elastic connection between the cars; and, on the other hand, as its elastic force is not exhausted in coupling the cars, it will take up the shocks produced by the cars bumping together, so that the train will be drawn with an easy and steady motion, and without jerks or concussions.

I prefer to make the range of motion of the buffer-spring at least twice as great as that of the draw-spring; but this construction, although useful in practice, forms no part of my invention, which consists in such an arrangement of the buffer and coupling-hook with relation to the springs that the outer face of the buffer shall project beyond the inner face of the coupler a greater distance than the range of the draw-spring, while the range of the buffer-spring shall be greater than the distance which the outer face of the buffer projects beyond the inner face of the coupler.

The coupling-hooks $a$ $a$ are made in the form shown in Figs. 1 and 3, their upper and lower faces being flat, parallel, and alike. They are pressed inward by the pusher $k'$, which works in a bushing or collar in a box secured to the buffer-beam, and containing a spring, $k$, by which the pusher is actuated. The hooks force each other apart when brought together in coupling the cars, until the inner faces pass each other, when they spring together and are automatically locked. The inner face, 3, of the hook forms a right angle with the axis of the shank, as shown in Fig. 3, so that when the cars are coupled the plane of this face is parallel to the front face of the buffer-beam. Between this face and the shank is the semicircular groove 4.

By reference to Fig. 3 it will be seen that when the cars are coupled and moving in a straight line the draft is on and perpendicular to the inner faces of the interlocking coupling-hooks, and that these faces overlap each other. The semicircular grooves 4, by diminishing the amount of interlocking surface, and consequently the friction produced by drawing the hooks apart, facilitate the operation of disconnecting the cars; and when the cars are running on short curves or onto switches these grooves permit the edges of the inner faces to project into them in turning, so as not only to give the hooks a more effective hold, but to avoid pressing back the springs $k$. Under ordinary circumstances the point or rounded beveled surface at the end of one hook does not touch the shank of the other. When, however, a car deviates to either side of the track, these parts come into contact; and if the deviation should amount to an angle of thirty-five degrees, or thereabout, with the line of the track on either side, the pressure of these parts will force the interlocking faces laterally asunder, and the deviating cars be disconnected by their own deviation, as shown in dotted lines in Fig. 3.

When it is desired to disconnect the cars, the coupling-hooks are drawn apart by operating the hand-wheel shown in Fig. 9, thereby turning the crank $n$ on the lower end of the spindle and drawing the coupling-hook outward by a chain connected to the crank. The hook is retained in this position by the ratchet and pawl. The crank being in the position shown in Fig. 7 when the cars are coupled, it is evident that its power increases as it is turned away from the coupling-hook, thereby counteracting the increasing resistance of the spring $k$ and obviating the necessity of increasing the exertion applied to the hand-wheel.

The above-described mode of construction enables my improvement to be attached to the railroad-cars now in use in this country, without any alteration, by merely bolting the blocks $e$ $e$ underneath the ordinary platform. I have described these blocks as used to support the coupling and draft mechanism; but it is evident that they might be used to support the buffer without departing from the principle of my invention, as in the case where the coupler should be located above the buffer.

What I claim as my invention, and desire to secure by Letters Patent of the United States, is—

1. The above-described arrangement of the buffer and coupling-hook, in which the outer face of the buffer projects beyond the inner face of the coupling-hook a greater distance than the range of motion of the draw-spring, and the range of motion of the buffer-spring is greater than the distance which the outer face of the buffer projects beyond the inner face of the coupling-hook.

2. The coiled spring, projecting into the slots of the plates $f$ $f$, so as to relieve the guides $f'$ $f'$ from the strains produced by the draft, or the bumping together of the cars.

3. The coupling-hooks, constructed with the grooves 4, operating as described, and with the faces to which the draft is applied perpendicular to the line of draft when the cars are coupled and moving in a straight line.

4. The combination, operating as described, of the hand-wheel, spindle, crank, and chain, with the coupling-hook, and also with the spring $k$ and pusher, or their equivalents.

P. G. GARDINER.

Witnesses:
A. ROOVERS,
C. R. WAGNER.